(12) United States Patent
Takahashi et al.

(10) Patent No.: US 7,803,462 B2
(45) Date of Patent: Sep. 28, 2010

(54) TITANIUM MATERIALS WITH COATING LAYER, LAMINATED GLASS USING THE SAME AND METHODS OF MANUFACTURING THE SAME

(75) Inventors: Takehiro Takahashi, Futtsu (JP); Michio Kaneko, Futtsu (JP); Hiroshi Osawa, Tokyo (JP); Hiroshi Kanai, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 397 days.

(21) Appl. No.: 10/498,746

(22) PCT Filed: Oct. 14, 2003

(86) PCT No.: PCT/JP03/13138

§ 371 (c)(1),
(2), (4) Date: Jun. 14, 2004

(87) PCT Pub. No.: WO2004/035863

PCT Pub. Date: Apr. 29, 2004

(65) Prior Publication Data

US 2005/0123745 A1    Jun. 9, 2005

(30) Foreign Application Priority Data

Oct. 15, 2002  (JP) ............................. 2002-300603
Jan. 22, 2003  (JP) ............................. 2003-013407

(51) Int. Cl.
*B32B 9/00*   (2006.01)
(52) U.S. Cl. ..................... 428/426; 428/432; 428/701; 428/702
(58) Field of Classification Search ............. 428/472.1, 428/433, 434
See application file for complete search history.

(56) References Cited

U.S. PATENT DOCUMENTS 3,643,658 A  *  2/1972  Steinemenan ................ 606/76

(Continued)

FOREIGN PATENT DOCUMENTS

JP          54-62456           10/1952

(Continued)

OTHER PUBLICATIONS

Japanese Office Action dated Aug. 8, 2008 issued in corresponding Japanese Application No. 2003-013407.

(Continued)

*Primary Examiner*—Timothy M Speer
(74) *Attorney, Agent, or Firm*—Kenyon & Kenyon LLP

(57) ABSTRACT

The titanium materials of the present invention have an oxide film on the surface and an interference color of the oxide film. In forming a transparent coating layer on the surface of the titanium materials, provisions are made so that the oxide film has an thickness of 150 nm to 600 nm, or the interference color due to the anodic oxide film is developed by the actions of both wavelengths strengthened and weakened by interference and the color phases of the color developed by the wavelength strengthened by interference and that of complementary colors of the color developed by the wavelength weakened by interference are as close to each as not more than 90 degrees apart on the color wheel, or the L* value on the L*a*b* calorimetric system is not less than 33. The laminated glasses of the present invention having excellent ornamentality comprise at least said titanium sheet interposed between multiple sheet glasses layered together by means of adhesive layers.

16 Claims, 3 Drawing Sheets

U.S. PATENT DOCUMENTS 5,370,913 A    12/1994  Lin
6,720,089 B2 *  4/2004  Nemchock .................. 428/660

FOREIGN PATENT DOCUMENTS

| JP | 63-50497 | 3/1988 |
|---|---|---|
| JP | 6-47339 | 6/1994 |
| JP | 6-047339 | 6/1994 |
| JP | 9-315830 | 12/1997 |
| JP | 10-130886 | 5/1998 |
| JP | 54-62456 | 1/2002 |
| JP | 2002-012456 | 1/2002 |

OTHER PUBLICATIONS

Hidetoshi Yamaguchi, Kenji Miki "Titanium coloring and application to construction field" ALUTOPIA 1987 vol. 11, pp. 41-48.

"Surface Treating Measures Q and A 1000" compiled by the Surface Treating Measures Q and A 1000 Editorial Committee (p. 634, published by Sangyo Gijutsu Service Center Co., Ltd. In May 1998.).

* cited by examiner

US 7,803,462 B2

TITANIUM MATERIALS WITH COATING LAYER, LAMINATED GLASS USING THE SAME AND METHODS OF MANUFACTURING THE SAME

TECHNICAL FIELD

This invention relates to titanium materials with a surface-coating layer and their manufacturing methods and, more particularly, to titanium materials, whose surfaces are colored by the interference action of oxide films, are covered with a transparent coating layer to prevent discoloration, and manufacturing methods thereof. This invention also relates to laminated glass, comprising a titanium sheet sandwiched between sheet glasses and having excellent ornamentality, and manufacturing methods thereof.

BACKGROUND TECHNOLOGY

Titanium, that exhibits very high corrosion resistance in the atmosphere, is used in building applications such as roofs and walls in seacoast areas. Although more than ten years have passed since titanium began to be used for roofs and other building materials, no cases of corrosion have ever been reported. However, the surface of titanium, depending on service environment, sometimes becomes a dark golden color during long use.

Though this discoloration is limited to the very shallow surface and, therefore, does not impair the anti-corrosive function of titanium, it sometimes gives rise to problems when titanium materials colored by interference color are used for their ornamentality.

Because of their ornamentality, titanium materials colored by the interference color are also used in applications other than outdoor ones. Because coloring is based on the interference action of oxide films, smudging with finger prints or oily stains makes the smudged part appear to have a different color tone and is noticeable.

To prevent the environment-dependent discoloration mentioned first, Japanese Unexamined Patent Publication 130886 of 1998, for example, discloses a method to prevent discoloration of titanium materials by specifying the structure of oxide films on them.

"Surface Treating Measures Q and A 1000" compiled by the Surface Treating Measures Q and A 1000 Editorial Committee (page 634, published by Sangyo Gijutsu Service Center Co., Ltd. In May 1998) depicts a method to prevent surface discoloration, deterioration and contamination by applying transparent coatings. However, this document also says that "this method sacrifices the color of interference coating in preventing contamination and, therefore, no methods to prevent surface contamination without losing the color of interference coating have ever been established." Contamination can be also prevented by sandwiching a titanium sheet between sheet glasses by way of adhesive layers. However, the surface of titanium sheets sandwiched between sheet glasses are similar to that of titanium sheets covered with transparent coating. Therefore, the interference color is impaired as in the case of titanium sheets covered with a transparent coating.

Laminated glasses are manufactured by inserting one or more strong transparent synthetic resin films between two or more sheet glasses, with application of heat and pressure. When laminated glasses break, the strong synthetic resin film prevents shattering of glass and provides safety. When laminated glasses are hit, the strong synthetic resin films do not allow the penetration of the hitting object and, thus, prove effective in crime prevention. Because of these advantages, laminated glasses are widely used for windows, doors and other applications in automobiles and other transportation facilities and buildings.

Laminated glasses sandwiching sheets of paper or cloth or metal foils between two or more sheet glasses to enhance ornamentality are also proposed (as in, for example, Japanese Unexamined Patent Publication 12456 of 2002 and Japanese Unexamined Utility Model Publication 47339 of 1994). Inserting sheets of paper or cloth or metal foils between sheet glasses provide higher ornamentality to laminated glasses by permitting the degree of transparency (including semitransparency and opaqueness), color and pattern to be variously altered depending on use.

Titanium is used for roofs, walls and other building materials in coastal regions as they exhibit very excellent corrosion resistance in the atmospheric environment and titanium colored by the interference color has high ornamentality because of the vivid colors that change with the angle of view. Although more than ten years have passed since titanium began to be used for roofs and other building materials, no cases of corrosion have ever been reported. However, the surface of titanium, depending on service environment, sometimes becomes a dark golden color during long use.

DISCLOSURE OF THE INVENTION

An object of this invention is to provide titanium materials, colored by the interference color and with excellent ornamentality, that have a surface coating layer to prevent discoloration due to the deterioration of the oxide film and color changes due to smudges on the surface occurring use as roofs, walls and other building materials in atmospheric environments and methods of manufacturing the same.

Another object of this invention is to provide laminated glasses having greater ornamentality than conventional ones by permitting preservation of the beautiful appearance characteristic of titanium sheets and methods of manufacturing the same.

The present invention aims at protecting the surface of titanium materials colored by the interference color without impairing the ornamentality thereof. The inventor discovered that provision of a transparent coating layer does not impair the interference color by appropriately controlling the thickness of oxide film, the coloring mechanism of interference color and the lightness in color of base sheets. The inventor also discovered that laminated glasses, making the most of the beautiful appearance characteristic of titanium sheets, can be manufactured. The gist of the present invention, that was completed based on these findings, is as follows:

(1) A titanium material having an oxide film with an interference color formed on the surface thereof and covered with a transparent coating layer, characterized in that said oxide film has a thickness of 150 to 600 mm.

(2) A titanium material having an oxide film with an interference color formed on the surface thereof whose interference color is developed by the action of a wavelength strengthened by interference and a wavelength weakened by interference and covered with a transparent coating layer, characterized in that the color phases of the color developed by the wavelength strengthened by interference and that of complementary colors of the color developed by the wavelength weakened by interference are as close to each other as not more than 90 degrees apart on the color wheel.

(3) A titanium material having a coating layer on the surface thereof described in (1), characterized in that the color phases of the color developed by the wavelength strengthened by interference and that of complementary colors of the color developed by the wavelength weakened by interference are as close to each other as not more than 90 degrees apart on the color wheel.

(4) A titanium material having a coating layer on the surface thereof, characterized in that the titanium material whose lightness in color before the formation of the coating layer is not less than 33 in terms of the L* value on the L*a*b* colorimetric system based on JIS Z 8730.

(5) A titanium material having a coating layer on the surface thereof described in any of (1) to (3), characterized in that the titanium material whose lightness in color before the formation of the coating layer is not less than 33 in terms of the L* value on the L*a*b* calorimetric system based on JIS Z 8730.

(6) A titanium material having a coating layer on the surface thereof described in any of (1) to (5), characterized in that said oxide film is covered with an alkali titanate layer.

(7) A titanium material having a coating layer on the surface thereof described in any of (1) to (5), characterized in that said oxide film is covered with an alkali titanate layer.

(8) A titanium material having a coating layer on the surface thereof described in any of (1) to (7), characterized in that said transparent coating layer is a clear paint film.

(9) A titanium material having a coating layer on the surface thereof described in any of (1) to (7), characterized in that said transparent coating layer is a layer of adhesive.

(10) A laminated glass comprising multiple sheet glasses layered together by means of an adhesive layer with the titanium material described in any of (1) and (7) interlayered between said sheet glasses by way of said layer of adhesive.

(11) A laminated glass described in (10) in which said titanium materials have openings of 1 to 90 percent in said titanium materials.

(12) A laminated glass described in (10) in which the light transmittance of said layer of adhesive at the wavelength between 100 and 390 nm is not greater than 1 percent.

(13) A laminated glass described in (10) or (11) in which said layer of adhesive is a hot melt adhesive.

(14) A method for manufacturing the titanium material having a coating layer on the surface thereof described in any of (1) to (9) comprising the steps of forming an oxide film on the surface of a titanium material, treating in an alkaline solution, and covering the surface with a transparent coating layer.

(15) A method for manufacturing the titanium material having a coating layer on the surface thereof described in (14) in which the pH of said alkaline solution is not lower than 8 and not higher than 14 and the treatment temperature is not lower than 10° C. and not higher than 90° C.

(16) A method for manufacturing the laminated glass described in any of (10) to (13) comprising the steps of forming an oxide film on the surface of a titanium sheet, treating in an alkaline solution, and lamination the titanium sheet and sheet glasses through an adhesive layer.

(17) A method for manufacturing the laminated glass described in (16) in which the pH of said alkaline solution is not lower than 8 and not higher than 14 and the treatment temperature is not lower than 10° C. and not higher than 90° C.

(18) A method for manufacturing the laminated glass described in (16) or (17) in which the layer of adhesive is sheet-formed and the sheet glasses, sheet-formed adhesive and titanium sheet are layered together in the desired order and laminated together by hot press lamination.

PREFERRED EMBODIMENTS OF THE INVENTION

Figure 1:
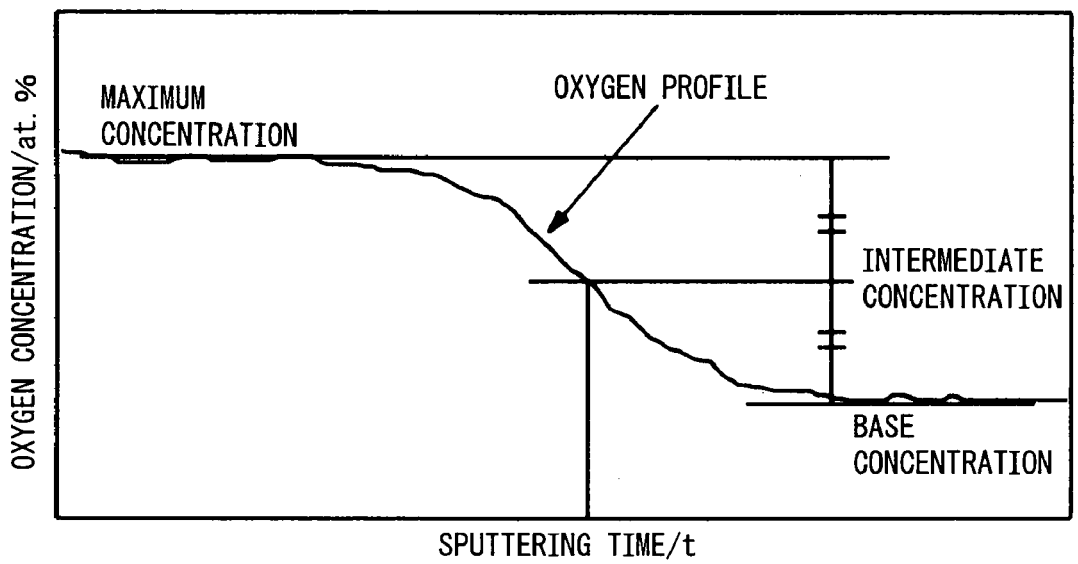
FIG. 1 is a diagram to show the measurement of the thickness of the oxide film or the layer of alkali titanate by Auger electron spectroscopy.

While the oxide film on the surface can be prepared either by anodic oxidation in an electrolyte or chemical oxidation in a solution containing hydrogen peroxide or a strong acid or a strong alkaline solution, anodic oxidation with the titanium material acting as the anode is preferable because it easily provides uniform color. While the electrolyte solution is not particularly limited, a solution containing phosphoric acid, sulfuric acid, boric acid or one or more salts of said acids is generally used. The desired color is developed by a commercially used method that controls the voltage applied to the titanium material. An oxidation process using a combination of hydrofluoric acid with nitric acid or an oxidizing agent such as oxygenated water can be added before the anodic oxidation process for the removal of contamination from the surface of base titanium sheet or to the control of the surface luster thereof.

The thickness of the oxide film formed on the surface should preferably be not smaller than 150 nm and not greater than 600 nm. If the thickness is smaller than 150 nm, the interference color is sometimes significantly impaired on formation of the coating layer. To leave a more vivid interference color after the formation of the transparent coating layer, thicker oxide films are preferable. Forming an oxide film not smaller than 200 nm in thickness is conducive to leaving a more vivid interference color. If, however, the thickness of the oxide film exceeds 600 nm, the interference color disappears before the coating layer is formed. Therefore, the thickness of the oxide film should preferably be between 200 and 600 nm.

The thickness of the oxide film can be determined by Auger electron spectroscopy. With a 1 mass percent phosphoric acid solution and SUS 304 stainless steel serving as the electrolyte solution and cathode, an oxide film with a thickness of 150 to 600 nm is obtained by applying constant voltage electrolysis at approximately 30 to 140 V. The relationship between electrolysis voltage and film thickness varies because solution resistance varies with the bath composition and the position of the cathode in the electrolyte solution and hydrogen generation voltage varies with the type of the cathode.

The interference color developed by the oxide film is due to the action of wavelengths both strengthened and weakened by interference. The color phase of the color developed by the wavelength strengthened by interference and that of complementary colors of the color developed colors of the wavelength weakened by interference should be as close to each other as not more than 90 degrees apart on the color wheel.

When only the wavelength corresponding to the color developed by interference is strengthened, or when only the wavelength corresponding to the complementary color of the developed color is weakened, or when the color phases of the color corresponding to the wavelength strengthened by interference and the color corresponding to the wavelength weakened by interference are as close as not more than 90 degrees away from each other on the color wheel, formation of a transparent coating layer on the surface sometimes significantly impairs the interference color. If, however, the interference color is developed by the actions of wavelengths both strengthened and weakened by interference and the color phases of the color developed by the wavelength strengthened by interference and that of complementary colors of the color developed by the wavelength weakened by interference are as close to each other as not more than 90 degrees apart on the color wheel, formation of a transparent coating layer on the surface does not impair the interference color because of the combined effect thereof.

When there are at least one each of wavelengths strengthened and weakened by interference in the wavelength range of 360 to 800 nm corresponding to visible light, formation of a transparent coating layer on the surface does not impair the interference color if the color phases of the color developed by additive mixing the colors corresponding to one or more wavelengths strengthened by interference and that of the complementary colors of the color developed by additive mixing the colors corresponding to one or more wavelengths weakened by interference are not more than 90 degrees away on the color wheel because of the combined effect thereof. However, when five or more wavelengths strengthened and weakened by interference exist in the visible light wavelength range of 400 to 760 nm corresponding to relatively vivid colors, no vivid interference color appears before the coating layer is formed because the effects of such colors are mutually cancelled.

When a titanium material is colored by anodic oxidation, several rotations are made on the color wheel through different gradations of chroma and lightness as the coloring voltage and oxide film thickness are increased until they converge to a low chroma color. Formation of an oxide film first develops yellow and then blue. Color development continues in the order or yellow and blue, followed by green, pink and other colors. Here, the yellow appearing first is called yellow of the first round, the blue appearing next blue of the first round, the yellow appearing next yellow of the second round, the blue appearing next blue of the second round, and the green appearing next green of the second round.

The yellow and blue of the first round appear when only the wavelength corresponding to the developed color, only the wavelength corresponding to the complementary color of the developed color, or the color phases of colors corresponding to the wavelengths strengthened and weakened by interference are as close as not more than 90 degrees apart on the color wheel. Therefore, formation of a transparent coating layer on the surface significantly impairs the interference color. Incidentally, the yellow of the first round is developed by weakening by interference of only the wavelength corresponding to blue that is the complementary color of yellow. The darker blue of the first round appearing in the early stage is developed by weakening by interference of only the wavelength corresponding to yellow that is the complementary color thereof, whereas the lighter blue appearing subsequently is developed by strengthening by interference of only the wavelength corresponding to blue and, at the same time, by weakening by interference the wavelength corresponding to purple that is close to blue.

In comparison, the yellow and blue of the second round are developed by the action of both wavelengths strengthened and weakened by interference. To be more specific, the yellow and blue of the second round are developed by the combined effect of the color phases of the color corresponding to the wavelength strengthened by interference and the complementary color of the color corresponding to the wavelength weakened by interference that are not more than 90 degrees apart on the color wheel. Therefore, formation of the transparent coating layer does not erase the interference color. Incidentally, the yellow of the second round develops when interference strengthens the wavelength corresponding to yellow and weakens the wavelength corresponding to blue that is the complementary color of yellow. The blue of the second round develops when interference strengthens the wavelength corresponding to blue and weakens the wavelength corresponding to yellow that is the complementary color of blue.

The green of the second round develops when there are one wavelength strengthened by interference and two wavelengths weakened by interference in the wavelength range of 360 to 800 nm that corresponds to visible light. The color phases of the color corresponding to the strengthened wavelength and the complementary color of the color obtained by adding and mixing the colors corresponding to the two weakened wavelengths are not more than 90 degrees apart on the color wheel and the combined effect thereof develops the green of the second round. Thus, formation of the transparent coating layer does not erase the interference color. Incidentally, the green of the second round develops when interference strengthens the wavelength corresponding to green and weakens the wavelengths corresponding to red and purple.

The color of titanium materials having colors developed by the interference color of the oxide film formed on the surface thereof by anodic oxidation in an electrolyte solution can be expressed by the L* value of the L*a*b* colorimetric system based on JIS Z 8730. The L* value should preferably be not lower than 33. If the L* value is lower than 33, formation of the coating layer sometimes impairs the interference color.

When formation of the transparent coating layer erases the interference color, the color of the surface changes to a color close to gray. Lighter colors with higher L* values are less susceptible to the influence of the coating layer.

Though not particularly limited, the thickness of the transparent coating layer formed on the surface should preferably be not less than 0.5 µm. If the thickness is smaller than 0.5 µm, the transparent coating layer itself sometimes possesses an interference effect that cancels the interference color caused by the oxide film, makes it difficult to secure uniformity of coating and causes color heterogeneity on the surface. Though thicker coating layers do not produce any particular problems so far as transparency is maintained, a thickness not more than 2 mm is sufficient from the viewpoint of cost efficiency except in cases where, for example, surface irregularities must be absorbed.

In forming a transparent coating layer on the titanium material colored by the interference color of the oxide film formed on the surface thereof by anodic oxidation in an electrolyte solution, it is preferable to pretreat in an alkaline solution.

Sodium hydroxide, potassium hydroxide, lithium hydroxide, carbonate, metasilicate, orthometasilicate, phosphate, pyrophosphate, condensation-polymerized phosphate hydrochloride, bicarbonate and surface-active agent can be used as the primary constituent of alkaline solutions.

The pretreatment should be done in an alkaline solution whose pH is not lower than 8 and not higher than 14 and at a temperature not lower than 10° C. and not lower than 90° C. It is more preferable, depending on the composition and the way of use of the alkaline solution, that the temperature is not lower than 35° C. and not higher than 80° C. and the pH is not lower than 9 and not higher than 13.5. In this range, the desired effect is obtained in several tens of seconds to a few minutes. If the temperature and pH are lower, there are possibilities that adequate treatment takes long time and adequate effect cannot be obtained even if much time is spent. If the temperature and pH are higher, there are possibilities that, depending on the treatment time, the oxide film is damaged to cause a change in the interference color and equipment problems, such as the corrosion resistance of the alkaline bath vessel, arise.

Application of said treatment in the alkaline solution to the titanium material colored by the interference of the oxide film formed on the surface thereof by anodic oxidation in an electrolyte solution forms a layer of alkaline titanate on the surface of the oxide film that increases adherence between the titanium material and coating layer. Though not particularly limited, the alkaline titanate layer formed by the treatment in said alkaline solution is approximately 0.5 to 10 nm in thickness. The alkaline titanate layer does not affect the interference color if the thickness thereof is between approximately 0.5 to 10 nm. The thickness of the alkaline titanate layer can be determined by Auger electron spectroscopy.

Examples of alkaline titanates, depending on the alkaline solution used in the treatment, include sodium titanate, potassium titanate and lithium titanate.

Treatment in alkaline solutions is also usable for cleaning of titanium materials. The titanium oxide layer formed by anodic oxidation is porous and, therefore, intrinsically possesses a certain degree of adhesiveness with the coating layer due to the anchor effect. As, however, the titanium oxide formed by anodic oxidation is apt to adsorb smudges, good adhesiveness with the coating layer is difficult to obtain unless kept in environments that retard contamination immediately after anodic oxidation. When, however, titanium materials are transported or subjected to pressing, punching or other similar operations, oil or a protective film is often applied to prevent surface damages. Residual oils and residual phosphate esters or other release agents or adhesives from protective films, even if invisible, often adversely affect the adhesiveness with the coating layer. Therefore, another treatment is required to remove such oils and adhesives from the surface. Still, cleaning by organic solvents does not provide enough adhesiveness with the coating layer and treatment by acids tends to change the interference color by damaging the oxide film. In comparison, said treatment by alkaline solutions does not affect the interference color while preserving adequate adhesiveness with the coating layer.

The transparent coating layer can be formed by applying clear coating of either organic or inorganic substances. Publicly known substances, depending on applications, include polyester, polyethylene, polyurethane, polyamide, polyimide, polyvinyl, vinyl chloride, vinyl acetate, acrylic resin, epoxy resin, melamine resin, phenol resin, ketone resin, urea resin, fluororesin, silicone resin and copolymers thereof, water glass, alumina, silica, zirconia and other ceramics. Several organic and inorganic substances can be blended. Selected substances can be applied in any form suited for the application. Examples include organic solvent coating, water-based coating, colloidal dispersion coating, powder coating, electrodeposition coating, thermosetting coating and room-temperature drying coating.

The transparent coating layer may also consist of an adhesive or a tackiness agent selected from publicly known organic and inorganic substances depending on the application. For example, organic substances include polyethylene, polypropylene, polyisobutylene, polyvinyl butyral, vinyl acetate, vinyl chloride, acryls, methacryls, polystyrene, polyamide, alkyds, cellulose, cyanoacrylate, polyester, polyurethane, phenoxy, polysulfone, polyacrylsulfone, phenol, resorcinol, urea, melamine, furan, epoxy, isocyanate, silicone, diester acrylate, styrene-butadiene rubber, butyl rubber, polychloroprene, nitrile rubber, polysulfide, polyimide, polybenzimidazole and copolymers thereof. Natural substances include dextrine, soybean protein, albumin, rosin, shellac, gilsonite and casein. Organic substances include water glass, and colloids of alumina, silica and zirconia dispersed in water. Several organic and inorganic substances may also be blended depending on the application.

A transparent film can be layered by way of said adhesive or tackiness agent. In particular, it is preferable to lay a transparent film on top of the tackiness agent that does not harden and, therefore, does not prevent contamination on its own.

The transparent film is not particularly limited and can be selected from publicly known substances suited for the application. Examples include films of polyester, polypropylene, polyvinyliden, polyvinyl alcohol, polyethylene, polyamide, vinyl chloride, vinyliden chloride, vinyl acetate and cellophane. Sheets of such hard substances, whether organic or inorganic, as glass, acryls, polycarbonate, vinyl chloride, quartz, zirconia and alumina crystals can also be layered. The thickness of the film need not be greater than 2 mm when layered directly on the titanium material, except in some special applications. Yet, the transparent films and sheets layered by way of the adhesive may have a thickness of up to approximately 20 cm. Considering the filmability, the minimum thickness can be down to approximately 5 μm. The film can be applied not only in one layer but also in multiple layers.

The transparent coating layer and film need not be totally colorless and transparent. If transparent enough to keep the interference color unimpaired, the transparent coating layer and film can be colored. Matching the color of the coating layer or film and sheet with the interference color sometimes increases ornamentality.

When an adhesive or a tackiness agent is used, vibration-damping sheets can be manufactured by inserting an adhesive between two titanium sheets. Of course, a clear coating, an adhesive, a tackiness agent or a transparent film or sheet can be applied on the outer surface of the titanium sheets.

The method of clear coating application is not particularly limited but can be selected from publicly known application methods suited for the application. Examples include rolling coating, roller curtain coating, curtain flow, air-spraying, airless spraying, bar coating, doctor blading, electrostatic coating, dipping, brushing and T-die.

The method of adhesive application is not particularly limited but can be selected, depending on applications, as with clear coating.

The method of laying transparent films and sheets is not particularly limited but can be selected from publicly known methods. For example, transparent films and sheets can be applied before the adhesive hardens. When the adhesive is of the type that exhibits adhesiveness on application of heat, thermocompression bonding can be applied after the adhesive has been precoated and hardened. Thermocompression bonding can be also applied to an adhesive sheet placed between a titanium material and a transparent film or sheet.

The transparent film or sheet itself can be layered on the titanium material by thermocompression bonding when the transparent film or sheet is of the type that exhibits adhesiveness on application of heat.

Figure 2:
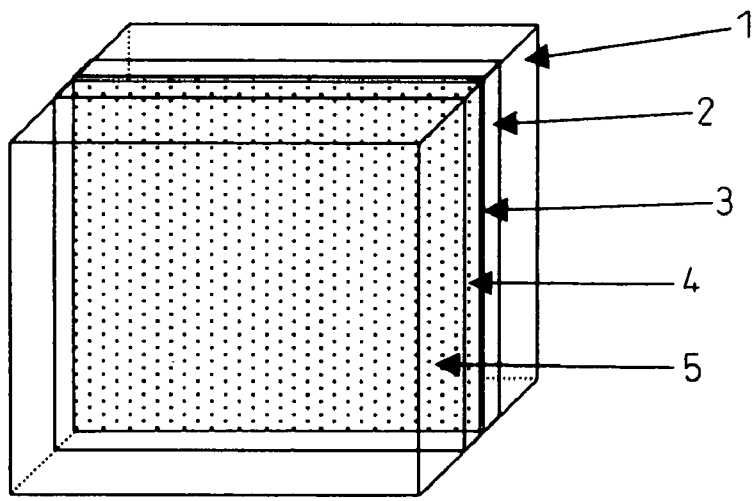
FIG. 2 shows the general structure of a laminated glass with an interlayer of a titanium sheet according to this invention.

FIG. 2 shows a partial cross-section of a laminated glass according to this invention. In FIG. 2, reference numerals 1 and 5 denote sheet glasses, 2 and 4 adhesive layers, and 3 a titanium sheet. The sheet glasses are ones used for conventional laminated glass. If the sheet glasses 1 and 5 are transparent, the laminated glass has an appearance that reflects the color and luster of the titanium sheet when looked at from either side. If either of the sheets glasses 1 and 5 is transparent, the appearance of the laminated glass reflects the color and luster of the titanium sheet only on the side of the transparent glass.

The titanium sheet may have apertures. Laminated glasses are often required to have not only beautiful appearance but also abilities to permit admittance of light from outside and viewing the outside from inside as with ordinary sheets of glass. If there are openings, the light of illumination in the evening passing outside therethrough and has a beautiful appearance. The amount of sunlight or other transmitted light can be adjusted by changing the opening ratio in the titanium sheet. To achieve such effect, the opening ratio should preferably be not smaller than 1 percent. If the opening ratio is smaller than 1 percent, the existence of apertures will probably become meaningless. If the opening ration is greater than 90 percent, the color of the titanium sheet is not much exploited and, as such, the use of titanium becomes meaningless. If the sheet size is large, difficult handling or other problems will arise. Therefore, an opening ratio not greater than 90 percent is preferable.

The method of making apertures is not particularly limited. Examples of applicable methods include punching, chemical melting by chemicals, electrochemical melting, an electric drill, a laser, a water cutter, snips, and a metal saw. While any of these methods can be combined, punching is most efficient and preferable. If provision of apertures causes distortion of the titanium sheet, a leveler can be used as required.

The most important object of inserting the titanium sheet according to this invention is to enhance ornamentality. Therefore, the thickness of the titanium sheet, though not particularly limited, need not be greater than 2 mm. If the thickness is smaller than 0.1 mm, the titanium sheet might possibly break when it is punched for provision of apertures, when it is layered with glass sheet or intermediate film or in other handling. Therefore, the preferable thickness is approximately not smaller than 0.1 mm and not greater than 2 mm. If breaking of the titanium sheet presents no problem, foil-like sheets thinner than 0.1 mm can be used.

The adhesive layer is required not only to have a good adhesiveness with glass and titanium sheets but also to have a low ultraviolet transmittance. Titanium oxide is formed on the surface of the titanium sheet. Titanium oxide is known to have a photocatalytic effect. The laminated glasses of this invention that have an excellent ornamentality are often used outdoors where they are directly exposed to the sun light. On such occasions, the photocatalytic effect of titanium oxide may possibly decompose the adhesive layer. With titanium oxide of the anatase type having a particularly high photocatalytic effect, there is a possibility that photocatalytic reaction proceeds when exposed to light with wavelengths not longer than 388 nm. Therefore, light with wavelengths not longer than that must be cut off. Of the light of the sun with wavelengths not longer than 388 nm, however, most with wavelengths under 100 nm is absorbed before reaching the ground. Accordingly, it is enough for the adhesive layer to cut off light of wavelengths not shorter than 100 nm and not longer than 390 nm. To be more specific, the transmittance of the light in said wavelength range is preferably not higher than 1 percent.

While two-part or photo-setting adhesives can be used for the laminated glass, hot-melt adhesives are easy to handle and are preferable. Hot-melt adhesives cross-linking on application of heat above a certain temperature are more preferable because of durability. Of the adhesives mentioned earlier, ethylene-vinyl acetate copolymer, ethylene-vinyl acetate alcohol copolymer, ethylene-methyl methacrylate copolymer, polyvinylbutyl, and polyurethane are usable. Particularly, ethylene-vinyl acetate copolymer is preferable and a thermosetting resin prepared by blending ethylene-vinyl acetate copolymer with organic peroxide is more preferable.

The form of adhesives is not particularly limited. Adhesives in sheet, powder, or paste form can be used.

Though varying with the condition of the sheet glasses and titanium sheet inserted therebetween and the object of application, the thickness of the sheet-form adhesive is preferably between approximately 0.1 and 2.0 mm. Several sheets of adhesive can be layered to obtain the desired thickness.

If the titanium sheet deforms because of the roughness of the glass or titanium sheet or provision of openings in the titanium sheet, the adhesive must be thick enough to cover the deformation.

Either one side or both sides of the sheet-form adhesive can be embossed to a depth of approximately 1 to 50 µm.

Regardless of the form of the adhesive, one acting as a spacer can be used to eliminate thickness variation that might occur in thermo-compression bonding.

The thickness of sheet glasses is not particularly limited and any appropriate one suited for the application can be chosen. Sheet glasses of thickness between approximately 2 and 25 mm are readily available and preferable. If any greater thickness is required, multiple sheet glasses can be layered together via adhesive layer. Even when the required thickness is smaller than 25 mm, thinner sheet glasses can be layered via adhesive layer to increase impact resistance.

The sheet glasses and adhesive layers need not be colorless and transparent. The sheet glasses and adhesive layers can be colored so long as transparency is large enough not to impair the color of the titanium sheet. Combining the color of the titanium sheet and that of the sheet glass and adhesive layer sometimes increases ornamentality.

In the present invention, the thickness of the film formed by anodic oxidation and that of the alkali titanate layer were determined by Auger electron spectroscopy. The thickness of the oxide film can be determined by also multiplying the sputtering time t required until the oxygen concentration decreases to the intermediate concentration between the maximum and base concentrations by the sputtering speed (oxide film thickness=sputtering time t×sputtering speed) as shown in FIG. 1 (Depth profile of oxygen concentration). The thickness of the alkali titanate layer was also determined by considering the alkali components (such as Na) in the same manner as in determining the thickness of the oxide film. The sputtering speed was converted from the speed at which $SiO_2$ was sputtered under the sputtering conditions used in measuring. The analysis described above was made under the conditions and by the method described below.

[Analysis Conditions]

Analysis equipment: PHI 610 scanning Auger electron spectroscope (manufactured by Perkin Elmer)

Primary electron: 5 kV-100 nA

Analysis area: approximately 20 µm×30 µm

Sputtering: Ar 2 kV-25 mA

Sputtering speed: Approximately 15 nm/min (converted for $SiO_2$)

[Analysis Method]

After first making a qualitative analysis of the outermost surface by wide scanning, depth composition analysis was made for the elements found by the qualitative analysis. To confirm the present elements, wide scanning was also conducted during the depth analysis,

EXAMPLES

Examples 1 to 7

The titanium sheets used had a thickness of 0.4 mm and anodic oxide films of thirteen different thicknesses between 45 and 645 nm formed by applying constant voltage electrolysis in a 1 mass percent solution of phosphoric acid with a cathode of SUS 304 stainless steel. After color development, the titanium sheets had been covered with a protective film (with an adhesive consisting mainly of acryl) and preserved.

The alkali solution was prepared by dissolving a chemical containing carbonate, silicate, phosphate, nitrite, condensed phosphate, bicarbonate and surfactant, such as FC-L-4480 manufactured by Nihon Parkerizing Co., Ltd., so that the solid content in 1 liter of water should become 20 g. The pH of the solution at 60° C. was 11 to 12.

The titanium sheets were dipped in said alkali solution kept at 60° C. for 3 minutes, washed in ion-exchanged water and dried by air blowing at room temperature.

[Comparison of Interference Colors Before and After Provision of Coating Layer]

To determine the change in interference color by the provision of a coating layer on the surface, polyester resin was applied by bar coating to a thickness of approximately 2 μm on the surface of titanium sheets having anodic oxide films of 45 to 645 nm in thickness and the colors before and after application were compared. The colors were measured by using the L*a*b* calorimetric system based on JIS Z 8730 and determined by visual observation.

Table 1 compares the film thicknesses, color developing mechanisms, L*1 values, color differences ΔE and results of determination by visual observation of the examples according to the present invention and examples for comparison. For the color developing mechanism, the cases in which the interference color due to the anodic oxide film is strengthened only at the wavelength corresponding to the color developed by interference, in which the interference color due to the anodic oxide film is weakened only at the wavelength corresponding to the complementary color of the developed color, or in which the color phases of the colors due to the wavelengths strengthened and weakened by interference are as close to each as not more than 90 degrees apart on the color wheel are designated by X. The case in which the interference color due to the anodic oxide film is developed by the actions of both wavelengths strengthened and weakened by interference and the color phases of the colors due to the wavelengths strengthened and that of the complementary colors of the color weakened by interference are as close to each as not more than 90 degrees apart on the color wheel are designated by ○. For the L*1 value, ○ designates 33 and above and X designates under 33. For the color differences ΔE, which was obtained from equation $\Delta E=\{(L*2-L*1)^2+(a*2-a*1)^2+(b*2-b*1)^2\}^{(1/2)}$, ○ designates under 2.5, Δ not less than 2.5 and under 5, and X over 5. Here, L*1, a*1 and b*1 are the values measured before coating while L*2, a*2 and b*2 are the values measured after coating. Regarding the determination by visual observation, ○ designates the case in which the interference color remained high enough to preserve good ornamentality and X designates the case in which the interference color was impaired to such a level as to lose good ornamentality or the surface color changed to gray.

TABLE 1

| | Film thickness/nm | Color developing mechanism | L*1 | ΔE | Determination by visual observation |
|---|---|---|---|---|---|
| Example for comparison 1 | 45.0 | X | X | Δ | X |
| Example for comparison 2 | 54.0 | X | X | X | X |
| Example for comparison 3 | 56.0 | X | X | X | X |
| Example for comparison 4 | 63.0 | X | X | X | X |
| Example for comparison 5 | 99.0 | X | X | X | X |
| Example of the invention 1 | 152.0 | ○ | ○ | Δ | ○ |
| Example of the invention 2 | 225.0 | ○ | ○ | ○ | ○ |
| Example of the invention 3 | 238.5 | ○ | ○ | ○ | ○ |
| Example of the invention 4 | 252.0 | ○ | ○ | ○ | ○ |
| Example of the invention 5 | 261.0 | ○ | ○ | ○ | ○ |
| Example of the invention 6 | 387.0 | ○ | ○ | ○ | ○ |
| Example of the invention 7 | 585.0 | ○ | ○ | ○ | ○ |
| Example for comparison 6 | 645.0 | No interference color | ○ | ○ | X |

The results show that the anodic oxide films under 150 nm in thickness lose interference color on application of clear coating while those 150 nm or above in thickness retain interference color even after application of color coating. It is also obvious that thicker anodic oxide films are more preferable. When the thickness of the anodic oxide film is greater than 600 nm as in the example for comparison 6, however, no vivid interference color is discernible even before the coating layer is formed on the surface. This is because, when the thickness of the anodic oxide film exceeds 600 nm, five or more wavelengths strengthened and weakened by interference exist in the wavelength range of 400 to 760 nm that corresponds to relatively vivid colors and cancel the effects of the individual wavelengths.

When the thickness of the anodic oxide film was greater than 600 nm, the original color itself was grayish because the color developing mechanism due to interference did not work.

Regarding the color developing mechanism, application of clear coating removes the interference color when only the wavelength corresponding to the color developed by interference is strengthened, or when only the wavelength corresponding to the complementary color of the developed color is weakened, or when the color phases of the color corresponding to the wavelength strengthened by interference and the color corresponding to the wavelength weakened by interference are as close as not more than 90 degrees away from each other on the color wheel. When, however, the interference color is developed by the actions of both wavelengths strengthened and weakened by interference and the color phases of the color developed by the wavelength strengthened by interference and that of complementary colors of the color developed by the wavelength weakened by interference are as close to each other as not more than 90 degrees apart on the color wheel, the interference color remains unremoved even on application of clear coating.

While application of clear coating removes the interference color when the L*1 value is under 33, the interference color remains unremoved when the L*1 value is 33 or above.

[Method for Manufacturing Laminated Glass]

Example 8

Figure 3:
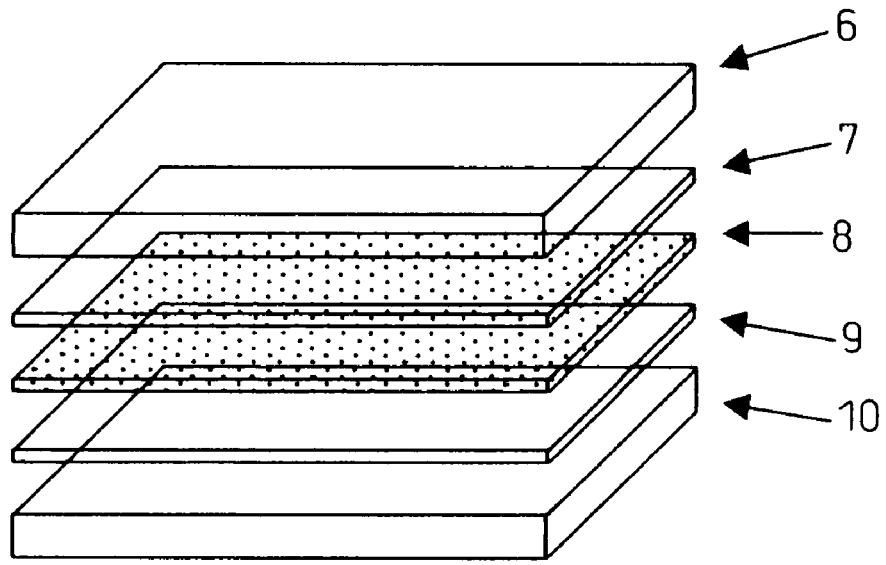
FIG. 3 shows how the sheet glasses, sheet-formed adhesive and titanium sheet are layered together in manufacturing a laminated glass.
Figure 4:
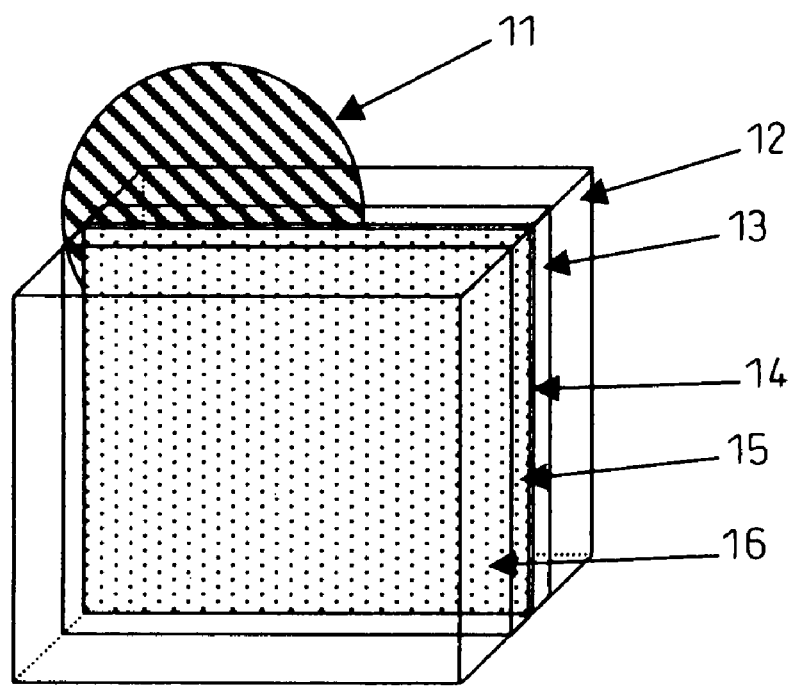
FIG. 4 shows a laminated glass with an interlayer of a titanium sheet not having apertures.

The sheet glass was an ordinary 6 mm thick sodium-calcium silicate glass. The sheet-form adhesive was a 0.45 mm thick adhesive consisting mainly of ethylene-vinyl acetate copolymer. The titanium sheet was a 0.4 mm thick sheet that had been preserved with a protective film (with an adhesive consisting mainly of acryl) on the surface. After removing the protective film, the titanium sheet was subjected to a treatment in an alkali solution as in the case of Examples 1 to 7. Then, a laminated glass having an interposed titanium sheet was prepared by layering together sheet glasses 6 and 10, sheet-form adhesives 7 and 9 and titanium sheet 8, as shown in FIG. 3, and applying thermo-compression bonding with a pressure of 5 kg/cm$^2$ and at a temperature of 130° C. by using a hot press. The sheet glass and titanium sheet were bonded together with good adhesiveness. In addition, the laminated glass had a high ornamentality reflecting the unique appearance of the interposed titanium sheet, without being affected by the object behind the laminated glass, as shown in FIG. 4.

Example 9

Figure 5:
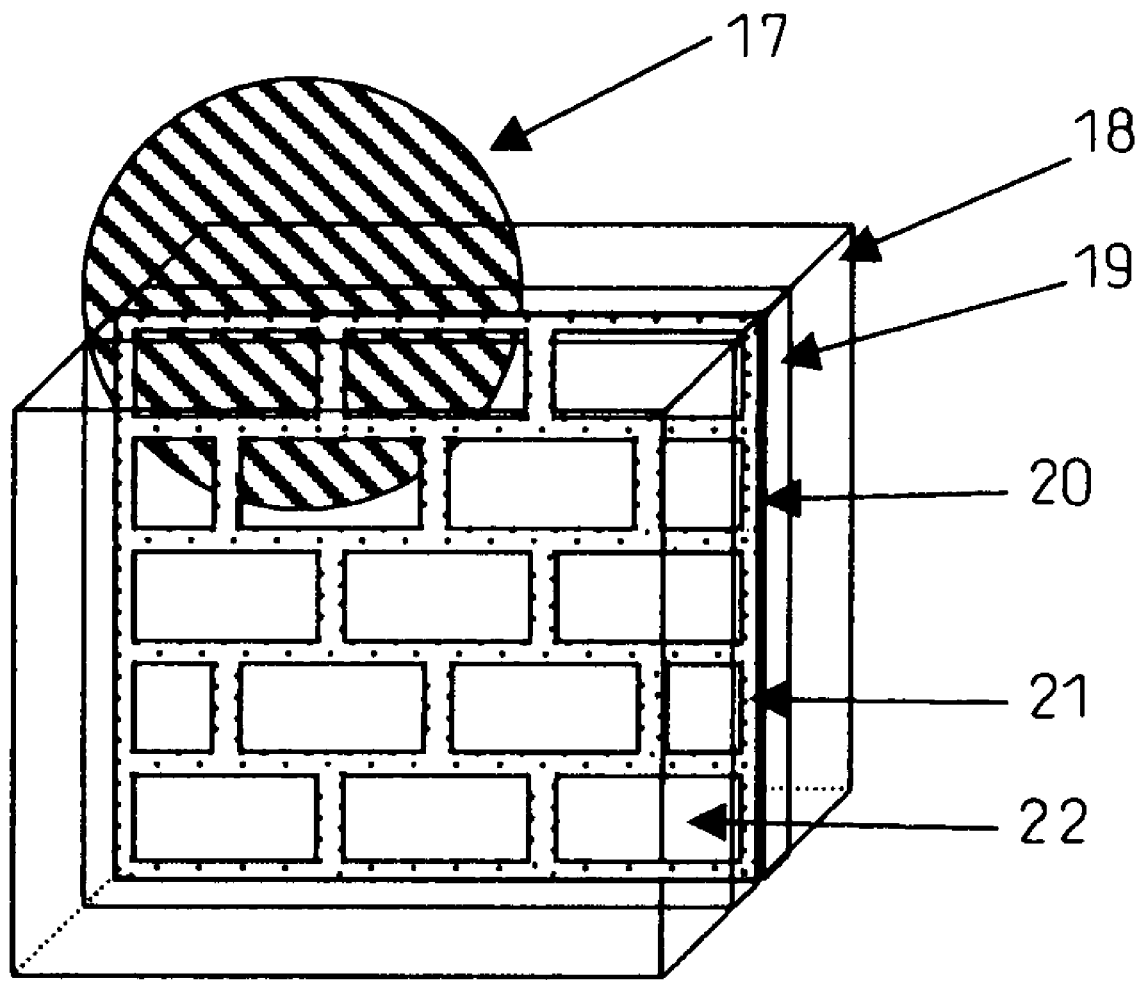
FIG. 5 shows a laminated glass with an interlayer of a titanium sheet having apertures.

FIG. 5 shows an example of the laminated glass interposed with a titanium sheet having openings. The openings in the interposed titanium sheet were made by punching. The laminated glass of Example 9, unlike that of Example 8, permits seeing the object therebehind through the openings. This feature permits the laminated glass to be used for windows. Also, the laminated glass had a high ornamentality reflecting the unique appearance of the interposed titanium sheet. Adequate adhesiveness was achieved without impairing the bonding with the sheet glasses despite the presence of the openings in the titanium sheet.

In manufacturing the laminated glass interposed with the titanium sheet having openings, the titanium sheet was punched to form the openings without removing the protective film. After then removing the protective film, the titanium sheet was subjected to degreasing in alkali and thermo-compression bonding under the same condition as for Example 8.

[Comparison of Colors Before and After Glass Laminating]

Examples 10 to 16

Titanium sheets having anode oxide films 45 to 645 nm in thickness were thermo-compression bonded to sheet glasses via adhesive layers in the same way as Example 8. The anodic oxide films on the titanium sheets were formed by applying constant voltage electrolysis to a 1 mass percent solution of phosphoric acid, with the cathode of SUS 304 stainless steel.

To determine the changes in color before and after application of glass lamination, measurement of the L*a*b* colorimetric system based on JIS Z 8730 and confirmation of color by visual observation were made.

Table 2 compares the film thicknesses, color developing mechanisms, L*1 values, color differences ΔE and results of determination by visual observation of the examples. Here, the color developing mechanisms are classified into:

1. The cases in which the interference color due to the anodic oxide film is strengthened only at the wavelength corresponding to the color developed by interference, in which the interference color due to the anodic oxide film is weakened only at the wavelength corresponding to the complementary color of the developed color, or in which the color phases of the color developed by the wavelength strengthened by interference and that of complementary colors of the color developed by the wavelength weakened by interference are as close to each as not more than 90 degrees apart on the color wheel.

2. The case in which the interference color due to the anodic oxide film is developed by the actions of both wavelengths strengthened and weakened by interference and the color phases of the color developed by the wavelength the strengthened by interference and that of complementary colors of the color developed by the wavelength weakened by interference are as close to each as not more than 90 degrees apart on the color wheel.

3. The case in which five or more wavelengths strengthened and weakened by interference exist in the visible light wavelength range of 400 to 760 nm corresponding to relatively vivid colors.

While the high lightness L*1 is not lower than 33, the low lightness L*1 is under 33.

The color differences ΔE, which was obtained from equation $\Delta E=\{(L^*2-L^*1)^2+(a^*2-a^*1)^2+(b^*2-b^*1)^2\}^{1/2}$. The small difference was under 2.5, the medium difference was not lower than 2.5 and under 5, and the large difference was over 5. Here, L*1, a*1 and b*1 are the values measured before bonding while L*2, a*2 and b*2 are the values measured after bonding. Regarding the results of visual observation, C designates the vivid color development by interference and G designates the color changed to gray.

TABLE 2

| | Film thickness/nm | Color developing mechanism | L*1 | ΔE | Determination by visual observation |
|---|---|---|---|---|---|
| Example for comparison 7 | 45.0 | 1 | Low | Medium | G |
| Example for comparison 8 | 54.0 | 1 | Low | Large | G |
| Example for comparison 9 | 56.0 | 1 | Low | Large | G |
| Example for comparison 10 | 63.0 | 1 | Low | Large | G |
| Example for comparison 11 | 99.0 | 1 | Low | Large | G |
| Example of the invention 10 | 152.0 | 2 | High | Medium | C |
| Example of the invention 11 | 225.0 | 2 | High | Small | C |
| Example of the invention 12 | 238.5 | 2 | High | Small | C |
| Example of the invention 13 | 252.0 | 2 | High | Small | C |
| Example of the invention 14 | 261.0 | 2 | High | Small | C |
| Example of the invention 15 | 387.0 | 2 | High | Small | C |
| Example of the invention 16 | 585.0 | 2 | High | Small | C |
| Example for comparison 12 | 645.0 | 3 | High | Small | —* |

*This example was not evaluated because the color thereof was silver gray before glass lamination, with no interference color.

The results show that laminated glasses exploiting the interference color can be obtained by using titanium sheets with anodic oxide films not less than 150 nm and not more than 600 nm in thickness. The anodic oxide film thicknesses not less than 200 nm and nor more than 600 nm are more preferable.

Regarding the color developing mechanism, the preferable titanium sheets are those whose interference color is developed by the action of both wavelengths strengthened and weakened by interference, with the complementary colors of the color developed by the wavelength strengthened by interference and that of the color developed by the wavelength weakened by interference as close to each other as not more than 90 degrees apart on the color wheel. The preferable lightness L* is not lower than 33.

[Changes in Adhesiveness between Titanium Sheet and Sheet-form Adhesive Caused by Alkali Treatment]

Examples 17 to 19

Three titanium sheets having an anodic oxide film with a thickness of 225 mm were, after removing the protective film, left untreated, ultrasonically cleaned for 3 minutes in MEK (methyl ethyl ketone) at room temperature, and in said alkali solution under said conditions. Analysis by the Auger spectroscopy showed no difference between the untreated and MEK cleaned titanium sheets. The titanium sheet treated in the alkali solution showed Na that was scarcely found in the untreated sheet. Depthwise analysis by said method showed that the Na concentration at a depth of 3 nm from the outermost surface was intermediate between the base concentration in the oxide film and the maximum concentration. This showed that the alkali titanate layer formed on the anodic oxide film had a thickness of 3 nm.

To determine the adhesiveness between said three titanium sheets and the sheet-form adhesive, 610 mm square laminated glass specimens were prepared by the preparation method described earlier and a falling ball test was conducted. Table 3 shows the results of the test conducted by dropping a steel ball weighing 1040±10 g from a height of 240 cm. Because the test was not conducted to evaluate the adhesiveness between the glass and sheet-form adhesive, evaluation was made on the following unique criteria. ○ denotes that the titanium sheet and adhesive layer stuck closely to each other, with no peeling. Δ denotes that the titanium sheet and adhesive layer did not stick co closely, with the partial peeling therebetween accounting for less than 30 percent of the whole area. X denotes that the titanium sheet and adhesive layer stuck poorly, with the peeling therebetween accounting for 30 percent or more of the whole area.

TABLE 3

|  | Method of treatment | N = 1 | N = 2 | N = 3 | N = 4 | N = 5 |
|---|---|---|---|---|---|---|
| Example of the invention 17 | Alkali treatment | ○ | ○ | ○ | ○ | ○ |
| Example of the invention 18 | Untreated | Δ | Δ | Δ | Δ | Δ |
| Example of the invention 19 | MEK cleaning | Δ | ○ | Δ | Δ | ○ |

Obviously, the titanium sheet treated in alkali solution proved to have greater adhesion with the adhesive layer than the titanium sheets untreated or cleaned in MEK.

INDUSTRIAL APPLICABILITY

This invention permits protecting the surface of titanium sheets while leaving the interference color thereof developed by interference by applying simple and inexpensive treatment without necessitating any substantial equipment revamping. This, in turn, permits using materials for buildings, household electrical appliances, furniture and various small articles exploiting the interference color of titanium over prolonged periods without requiring repairs. This invention also makes it possible to manufacture titanium-interposed laminated glasses having high ornamentality and exploiting the interference color of titanium, that can be used as building materials.

What is claimed is:

1. A titanium material having an oxide film with an interference color formed on the surface thereof and covered with a transparent coating layer, characterized in that said oxide film has a thickness of 150 to 600 nm and said transparent coating layer covering said oxide film is adhered to said oxide film.

2. A titanium material according to claim 1, characterized in that the color phases of the color developed by the wavelength strengthened by interference and that of complementary colors of the color developed by the wavelength weakened by interference are as close to each other as not more than 90 degrees apart on the color wheel.

3. A titanium material according to claim 1, wherein lightness in color before the formation of the coating layer is not less than 33 in terms of the L* value on the L*a*b* colorimetric system based on JIS Z 8730.

4. A titanium material according to claim 1, characterized in that the titanium material whose lightness in color before the formation of the coating layer is not less than 33 in terms of the L* value on the L*a*b* colorimetric system based on JIS Z 8730.

5. A titanium material according to claim 1, characterized in that said transparent coating layer is a clear paint film.

6. A titanium material according to claim 1, wherein the transparent coating layer is formed by rolling coating, roller curtain coating, curtain flow coating, air-spraying, airless spraying, bar coating, doctor blading, electrostatic coating, dipping, brushing, T-die coating, or bar coating.

7. A titanium material according to claim 1, wherein the transparent coating layer is a transparent film or sheet which is adhered to said oxide layer by an adhesive or tackiness agent.

8. A titanium material according to claim 1, wherein the transparent coating layer is a transparent film or sheet which is adhered to said oxide layer by thermocompression bonding.

9. A titanium material according to claim 1, wherein the transparent coating layer has a thickness of not less than 0.5 μm.

10. A titanium material having an oxide film with an interference color formed on the surface thereof whose interference color is developed by the action of a wavelength strengthened by interference and a wavelength weakened by interference and covered with a transparent coating layer, characterized in that the color phases of the color developed by the wavelength strengthened by interference and that of complementary colors of the color developed by the wavelength weakened by interference are as close to each other as not more than 90 degrees apart on the color wheel and said transparent coating layer covering said oxide film is adhered to said oxide film.

11. A laminated glass comprising multiple sheet glasses layered together by means of adhesive layers in which a titanium material is interlayered between said sheet glasses by way of said layers of adhesive, said titanium material having an oxide film with an interference color formed on the surface thereof and covered with a transparent coating layer, said oxide film having a thickness of 150 to 600 nm.

12. A laminated glass according to claim 11 in which said titanium material has openings of 1 to 90 percent in said titanium material.

13. A laminated glass according to claim 10 in which the light transmittance of said layer of adhesive at the wavelength between 100 and 390 nm is not greater than 1 percent.

14. A laminated glass according to claim 11 in which said layer of adhesive is a hot melt adhesive.

15. A titanium material having an oxide film with an interference color formed on the surface thereof and covered with a transparent coating layer, characterized in that said oxide film has a thickness of 150 to 600 nm and said oxide film is covered with an alkali titanate layer.

16. A titanium material having an oxide film with an interference color formed on the surface thereof and covered with a transparent coating layer, characterized in that said oxide film has a thickness of 150 to 600 nm and said transparent coating layer is a layer of adhesive.

* * * * *